United States Patent [19]

Rachal

[11] Patent Number: 4,904,436

[45] Date of Patent: Feb. 27, 1990

[54] CONSOLIDATION OF THERMOPLASTIC PANELS

[75] Inventor: Duane M. Rachal, Houston, Tex.

[73] Assignee: Phillips Petroleum Company, Bartlesville, Okla.

[21] Appl. No.: 149,756

[22] Filed: Jan. 29, 1988

[51] Int. Cl.$^4$ ............... B29C 43/20; B29C 43/02
[52] U.S. Cl. ............................ 264/258; 264/313
[58] Field of Search ........... 264/DIG. 50, 313, 257, 264/258, 313; 156/323, 242, 245; 425/DIG. 44; 428/268, 273

[56] References Cited

U.S. PATENT DOCUMENTS

| | | | |
|---|---|---|---|
| 2,916,771 | 12/1959 | Lang et al. | 425/DIG. 44 |
| 3,523,152 | 8/1970 | Curtis | 264/257 |
| 3,639,200 | 2/1972 | Elmendorf et al. | 156/323 |
| 3,930,091 | 12/1975 | Lewis et al. | 428/268 |
| 4,183,993 | 1/1980 | Benstead et al. | 425/273 |
| 4,379,013 | 4/1983 | Tambussi | 264/257 |
| 4,389,453 | 6/1983 | Kitanaka et al. | 264/258 |
| 4,461,800 | 7/1984 | Tanaka | 100/295 |
| 4,548,859 | 10/1985 | Kline et al. | 428/251 |
| 4,563,232 | 1/1986 | Peake | 156/182 |
| 4,624,820 | 11/1986 | Barraclough | 264/313 |
| 4,636,275 | 1/1987 | Norell | 156/289 |

FOREIGN PATENT DOCUMENTS 444255 9/1984 U.S.S.R. ............ 425/DIG. 44

Primary Examiner—Willard Hoag
Attorney, Agent, or Firm—Richmond, Phillips, Hitchcock & Umphlett

[57] ABSTRACT

Consolidation of thermoplastic composite panels in a platen press is facilitated by the positioning of resilient pads between the platens and the composite to be consolidated.

14 Claims, 1 Drawing Sheet

CONSOLIDATION OF THERMOPLASTIC PANELS

BACKGROUND OF THE INVENTION

This invention relates to a process for consolidating fiber-reinforced thermoplastic composite panels.

The production of thermoplastic composite panels containing fiber reinforcement and thermoplastic resin requires the application of heat sufficient to soften the thermoplastic resin together with the application of sufficient pressure, usually in a mold press, to cause the softened resin to wet out and encapsulate the reinforcing fibers. Many thermoplastic resins are highly viscous in the melt at a temperature near their softening point and must be subjected to high pressures to flow to the corners of the mold and adequately wet out the fiber reinforcement. Heating the resin to higher temperatures to improve the flowability trades off against the curing of the resin and/or exceeding the metallurgical limits of commonly used mold materials.

Another problem caused by the viscous thermoplastic resin resides in the difficulty of obtaining uniform pressure distribution by the mold press for uniform consolidation of the panel. For large panels, for example, panels measuring more than about 10 inches on each side, imperfect alignment of the mold press platens causes non-uniform wetout and consolidation of fibers and resin in the panel. The lack of uniform consolidation is undesirable for applications which require high quality parts, such as in the aerospace industry. The degree to which uniform consolidation has been effected during the molded cycle can be determined quantitatively by the C-scan technique, which is a non-destructive acoustic transmission test.

OBJECTS OF THE INVENTION

It is a first object of this invention to provide a process for consolidating a panel containing thermoplastic resin and fibrous reinforcement.

It is a second object of this invention to provide a process for producing a panel which is characterized by a uniform degree of consolidation.

It is another object of this invention to provide a process for producing thermoplastic composite panels of a consistently high quality.

SUMMARY OF THE INVENTION

In accordance with the invention, there is provided an improvement to the process for consolidating thermoplastic composite panels which are known to the prior art. In the prior art process, a mixture of fibrous reinforcement and thermoplastic resin was positioned between a pair of caul plates which were in turn positioned between a pair of platens which were urged together with sufficient force to consolidate the mixture of fibrous reinforcement and thermoplastic resin. The problem with the process was that uniform consolidation in all areas of the panel was not achieved, presumably due to non-uniform pressures being exerted on the mixture by the caul plates. In accordance with the invention, the process of the prior art is improved upon by positioning at least one resilient pad between at least one of the caul plates and at least one of the platens prior to urging the platens together. Experimental results indicate that so positioning even thin resilient pads provides marked improvement in the uniformity of consolidation in the composite product.

DETAILED DESCRIPTION OF THE INVENTION

Figure 1:
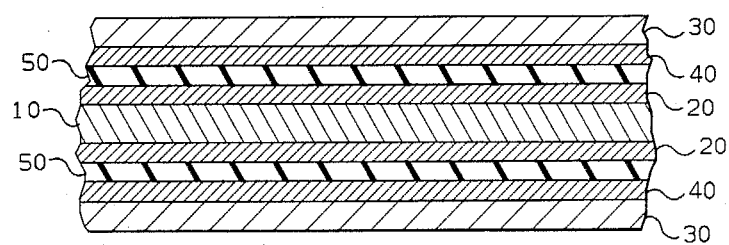

The process of the invention can be practiced in a platen press which is characterized by a pair of platens and a means for urging the platens together. The urging means can be of the pneumatic or hydraulic type, for example. Suitable means are well known. The platens are generally formed from a metal such as steel and have matching surfaces, usually flat, ranging in area from a few square inches to several square feet.

The mixture of thermoplastic resin and fibrous reinforcement is positioned between a pair of caul plates which are in turn positioned between the platens of the press. The caul plates are preferably formed from metal sheets, usually stainless steel, and have a thickness generally in the range of from about 0.5 to about 5 millimeters. The assembly of caul plates, resin, etc., which is placed between the platens is usually termed a layup.

The mixture of thermoplastic resin and fibrous reinforcement can take a variety of forms. For example, thermoplastic film can be laid up adjacent a random mat or fabric of the fibrous reinforcement, in several alternating layers if desired. Preferably, the mixture is in the form of one or more flat prepreg sheets of fibrous reinforcement carrying the thermoplastic resin in the form of particles or as a continuous matrix, preferably the latter.

In the preferred form of prepreg, the sheet contains long fiber reinforcement embedded in and surrounded by a continuous thermoplastic matrix. The long fiber reinforcement can be in the form of a fabric, or a random mat, or it can consist essentially of unidirectionally aligned reinforcing fibers. Rovings or yarns of the reinforcing fibers can be woven into a fabric or consolidated to form a random mat. Prepreg tapes consisting of unidirectionally aligned fiber reinforcement can be woven to form the fabric or fused together edge-to-edge to form the sheet. The sheets containing the fiber reinforcement can be stacked with the same or differing fiber orientation between the adjacent sheets to form laminates of extremely high structural strength. Sheets containing unidirectional fiber reinforcement are the preferred form of prepreg. Such unidirectional prepreg sheets are available from Phillips 66 Company of Bartlesville, Okla.

The invention can be used with most any thermoplastic resin. For example, it is believed that the invention will be suitable in the formation of composites from thermoplastic resins selected from the group consisting of polyolefin resins, polyester resins, polyamide resins, polyether resins, and polysulfide resins. Examples of suitable polyolefin resins are polyethylene and polypropylene resins. An example of a suitable polyester resin is poly(ethyleneterephthalate) resin, (PET). An example of a polyamide resin is Nylon 6,6. An example of a polyether resin is polyetheretherketone resin (PEEK) (actually poly(oxy-1,4-phenyleneoxy-1,4-phenylenecarbonyl-1,4-phenylene) or polyphenylene oxide resin, (PPO) (actually a blend of poly(2,6-xylenol) and impact polystyrene). An example of a polysulfide resin is poly(arylene sulfide) (PAS). Where a poly(arylene sulfide) resin is employed it is preferably selected from the group consisting of poly(phenylene sulfide) (PPS), poly(phenylene ketone phenylene sulfide), (PPSK) and poly(phenylene sulfone phenylene sulfide), (PPSS) and poly(biphenylene sulfide), (PBPS). Poly(arylene sulfide) resins are most preferred, because of their high use temperatures and excellent chemical resistance. The most preferred PAS resin is PPS, because if has been tested with good results. PPS resins are available from Phillips 66 Company under the Ryton trademark.

The fibrous reinforcement is preferably in the form of long fibers. Generally speaking, long fiber reinforcement will have a fiber length of at least one centimeter. Because certain product properties have a direct relationship with fiber length, it is preferred that continuous fibers be utilized. Continuous fiber reinforcement in the form of rovings of reinforcing fiber is generally preferred. Although most any fiber having stability to the temperatures employed in the molding process can be used, such as metal fibers or ceramic fibers, the invention is believed to have the greatest potential for use with readily available commercial fiber such as carbon fiber, glass fiber, and aramid fiber. Suitable fibers are well known.

The mixture of thermoplastic resin and reinforcing fiber will generally contain in the range of from about 10% up to possibly 80% by weight of the reinforcing fibers. Usually however, the mixture will contain in the range of from about 40 to about 70% by weight of the reinforcing fibers. Preferably, the remainder of the mixture consists essentially of the selected thermoplastic resin.

Generally speaking, the mixture of thermoplastic resin and reinforcing fibers will be positioned in a picture frame mold which extends around the outer periphery of the mixture forming a dam and a sufficient amount of the mixture will be positioned in the mold to completely fill the volume defined by the mold once consolidation of the mixture has occurred. The required amount of mixture is readily calculable from the densities of the thermoplastic resin and the fibrous reinforcement selected for use in the invention. In a typical embodiment, the invention is utilized to laminate together in the range of from 2 to 50 flat prepreg sheets each having a thickness in the range of from about 0.1 to about 10 millimeters to form a consolidated panel, although the invention could be used to consolidate single prepreg sheets if desired.

Preferably, at least one pair of resilient pads are employed in the invention, at least one being positioned between the caul plate and the platen on one side of the mixture and at least one being positioned between the caul plate and the platen on the other side of the mixture. For most convenience, it is most preferred that only one pair of resilient pads be employed, one resilient pad of the pair being positioned on each side of the mixture between the caul plate and the platen, although other arrangements, such as positioning a resilient pad in each corner of a thick caul plate may also be operable. By positioning resilient pads in the manner of the invention, equalization of the pressure exerted by the platens on the mixture is greatly improved.

Generally speaking, each of the resilient pads will have a thickness in the range of from about 0.1 up to about 10 millimeters, usually in the range of from about 0.5 up to about 5 millimeters. A resilient pad having a thickness of about 1 millimeter has been used with good results. The resilient pad can be formed from an elastomeric sheet provided that the elastomer is capable of withstanding the molding temperature employed. In such case the pad can be gas-impermeable. Fabric, which can be woven or non-woven, and mat, for example, steel wool, is also believed to be suitable for employment as the resilient pads. Each resilient pad preferably is sized for length and width about the same size as the caul plates.

In a preferred embodiment of the invention, the aforementioned caul plates are referred to as a pair of first caul plates. The process further comprises positioning a pair of second caul plates between the elastomeric pads and the platens, one second caul plate on each side of the mixture, so that each resilient pad is positioned between a first caul plate and a second caul plate. A first foil layer, such as aluminum foil, is positioned between each of the resilient pads and each first caul plate, and a second foil layer, which can also be aluminum foil is positioned between each of the resilient pads and each second caul plate. A first fabric layer is preferably positioned between each of the resilient pads and each first foil layer and a second fabric layer is preferably positioned between each of the resilient pads and each second foil layer. When the resilient pads are sandwiched up between fabric and foil in this described manner, they exhibit good working life and do not stick to the caul plates.

To prevent the mixture of thermoplastic resin and reinforcing fiber from sticking to the first caul plates, a first release film is preferably positioned between the mixture and each of the first caul plates. The mixture is prevented from sticking to the picture frame mold by preferably utilizing a mold release agent on the inside surface of the picture frame mold.

During use, the platens are heated to a set point temperature which is above the softening point of the selected thermoplastic resin. The layup is positioned between the platens and the thus heated platens are then usually held in contact with the layup, usually in contact with the second caul plates, to heat the mixture of fibrous reinforcement and thermoplastic resin to above the softening temperature of the resin. Usable platent temperatures generally range from about 200° C. up to 500° C., depending on the resin. In the case of polyphenylene sulfide, a desirable set point temperature for the platens is about 330° C. After a few moments of such contact, the platens are generally then urged together at a pressure sufficient to subject the mixture to adequate pressure to cause the resin to wet out the fibers under the molding conditions. Generally, the pressure at which the platens are urged together will be in the range of about 10 to about 1,000 lbs./sq. inch, gauge, usually in the range of from 25 to about 250 lbs./sq. inch, gauge. Pressure is maintained until fiber wet out has occurred, usually a few moments. The layup can be tapped or vibrated to facilitate the escape of gas pockets. The layup is then cooled such as by the flow of cooling fluid through the platens and removed from the press for recovery. If desired, the layup can be left between the platens for a slow cooling cycle or maintained at an elevated temperature between the platens to be annealed. Most preferably, because of quick cycle time, the layup is transferred to between another pair of platens at a different temperature for cooling under continued pressure.

The invention is illustrated by the following examples.

EXAMPLE 1

Ryton ® PPS AC40-66 unidirectional carbon fiber reinforced PPS tape (available from Phillips Chemical Company) was used to mold a 16-ply (+45°, −45°)$_8$, 10"×14" laminate using a molding layup consisting of positioning the 16-ply stack in a 10"×14" picture frame between two sheets of release film which, in turn, were positioned between two 0.075" thick stainless steel caul plates. This assembly was then positioned between the platens of a heated press held at 625° F. and the laminate was molded by applying contact pressure for six minutes, followed by six minutes at 200 psi. The assembly was then rapidly transferred to a press held at room temperature wherein 200 psi was reapplied for five minutes of cooling.

The resulting laminate was then subjected to a nondestructive C-scan analysis for defects using a Testech, Inc., Model MiS-100 C-scan apparatus with a 2.25 MH transducer. The C-scan indicated considerable consolidation defects in the laminate, with most occurring within a one and one-half inch band passing along two adjacent edges. The most void-free part of the laminate, as determined by C-scan, appeared to be in the corner exactly directly across the laminate from the corner containing the major concentration of defects. These findings indicate the laminate may have been subjected to uneven pressure during molding, with the area of highest pressure corresponding to the defect-free (well consolidated) section of the laminate and the area of low pressure corresponding to the area of maximum defects (poor consolidation).

EXAMPLE 2

The same materials and procedures were used in this example as were used in Example 1, above, with the following exceptions:

The laminate layup was $(0°)_{16}$ instead of $(+45°, -45°)_8$.

The assembly of prepreg in the picture frame between release films and caul plates was positioned, respectively between two sheets of 0.008" thick aluminum foil, two sheets of 0.005" thick glass fabric, two sheets of approximately 1/32" thick resilient rubber (Mosites #2902 high temperature cured elastomer), two sheets of 0.005" thick glass fabric, two sheets of 0.008" thick aluminum foil and two 0.036" thick stainless steel caul plates.

When the laminate produced by this layup was subjected to C-scan analysis, the resulting laminate showed an essentially defect-free area throughout.

That which is claimed is:

1. In a process for consolidating a fibrous reinforcement with a thermoplastic resin to form a sheet containing the fibrous reinforcement in a continuous thermoplastic matrix, wherein a mixture of fibrous reinforcement and thermoplastic resin in the form of at least one flat prepreg sheet is positioned between a pair of first caul plates which are in turn positioned between a pair of platens which are urged together with sufficient force to consolidate the mixture of fibrous reinforcement and thermoplastic resin to form the sheet containing the fibrous reinforcement in the continuous thermoplastic matrix, the improvement comprising:
positioning a first resilient pad, having a thickness within the range of about 0.1 to about 10 millimeters, and a third caul plate between one of the first caul plates and one of the platens so as to have on at least one side of said mixture the sequence: platen, caul plate, resilient pad and caul plate, prior to urging the platens together.

2. A process as in claim 1 further comprising urging the platens together at a pressure sufficient to subject the mixture to a pressure in the range of about 25 to about 250 pounds per square inch, gauge and wherein said resilient pad is formed of steel wool.

3. A process as in claim 2 wherein the thermoplastic resin is selected from the group consisting of polyolefin resin, polyester resin, polyamide resin and poly(arylene sulfide) resin and the fibrous reinforcement is selected from the group consisting of glass fiber, carbon fiber and aramid fiber.

4. A process as in claim 1 comprising in addition positioning a second resilient pad and a fourth caul plate on the other side of the mixture so as to give the sequence: platen, caul plate, resilient pad, caul plate, on both sides of the mixture.

5. A process as in claim 4 wherein the fibrous reinforcement is selected fromm the group consisting of a random mat of reinforcing fibers and a fabric of reinforcing fibers.

6. A process as in claim 4 wherein the at least one flat prepreg sheet comprises a plurality of flat prepreg sheets consisting essentially of unidirectional fiber reinforcement in said continuous thermoplastic matrix.

7. A process as in claim 4 wherein the at least one flat prepreg sheet comprises a plurality of sheets consisting essentially of a fabric of fiber reinforcement in said continuous thermoplastic matrix.

8. A process as in claim 4 wherein the at least one flat prepreg sheet comprises a plurality of tapes consisting essentially of unidirectionally aligned fiber reinforcement in said continuous thermoplastic matrix.

9. A process as in claim 8 wherein the tapes are woven to form a mat.

10. A process as in claim 4 wherein the mixture is positioned in a picture frame mold which extends around the outer periphery of the mixture, and a sufficient amount of the mixture is positioned in the picture frame mold to completely fill the volume defined by the picture frame mold once the platens have been urged together to consolidate the mixture.

11. A process as in claim 10 wherein the thermoplastic resin has a softening temperature, said process further comprising heating the platens and holding the thus heated platens in contact with the third and fourth caul plates to heat the mixture of fibrous reinforcement and thermoplastic resin to above the softening temperature of the thermoplastic resin.

12. A process as in claim 4 further comprising positioning a first foil layer between each resilient pad and each first caul plate and a second foil layer between each resilient pad and the third and fourth caul plates respectively.

13. A process as in claim 12 further comprising positioning a first fabric layer between each resilient pad and each first foil layer and a second fabric layer between each resilient pad and each second foil layer.

14. A process as in claim 13 further comprising positioning a release film between the mixture and each of the first caul plates.

* * * * *